May 26, 1942.　　　F. C. JOHNSON　　　2,284,488
MOLDED CHUTE OR GUIDE FOR MACHINE GUN CARTRIDGE BELTS
Filed Aug. 1, 1940　　　2 Sheets-Sheet 1

INVENTOR
F.C. JOHNSON

BY Blair & Kilcoyne
ATTORNEYS

May 26, 1942.  F. C. JOHNSON  2,284,488
MOLDED CHUTE OR GUIDE FOR MACHINE GUN CARTRIDGE BELTS
Filed Aug. 1, 1940  2 Sheets-Sheet 2

INVENTOR
F.C. JOHNSON
BY Blair & Kilcoyne
ATTORNEYS

Patented May 26, 1942

2,284,488

UNITED STATES PATENT OFFICE 2,284,488

MOLDED CHUTE OR GUIDE FOR MACHINE GUN CARTRIDGE BELTS

Francis Carl Johnson, Surbiton, England, assignor to The Hadley Company Limited, Surbiton, England, a British company Application August 1, 1940, Serial No. 349,153
In Great Britain December 15, 1938

9 Claims. (Cl. 89—34)

This invention relates to chutes or guides for use particularly in aircraft for guiding cartridge belts to machine guns.

According to the invention the multiple chute for guiding two or more belts is built up from components consisting of flanged strips of "plastic" material so constructed that they can be nested together to provide channels for the cartridge belts. The word "plastic" is intended to include organic materials such as cellulose derivatives, vulcanized rubber, chlorinated rubber, or artificial resins of various kinds which can be formed by pressing, molding, extruding or similar operations. Each component consists of a central portion which is more or less flat and two side flanges projecting either on the same side, so that the component is U-shaped in cross-section, or on opposite sides. In either case the side flanges are deeper than the channels to be provided for the passage of the belts so that the flanges of one component overlap those of the next when nested together. Each component may be of uniform thickness throughout and may be formed from sheet material by bending or pressing between dies while softened by heat or other agency or it may be molded to the required cross-section.

Conveniently, the flanges are joggled so as to provide shoulders about midway of their width to facilitate nesting together of the components.

Referring to the accompanying drawings,

Figure 1 is a perspective view of two components of a multiple chute according to this invention nested together, Figure 2 is an end elevation in cross-section, Figure 3 is a view similar to Figure 1 of a modified construction, Figure 4 is a similar view of a further modification, Figure 5 is a side elevation in cross-section, and Figure 6 is a cross-sectional view on a smaller scale showing a seven-fold chute.

Referring to Figures 1 and 2, each component is of channel or U-shaped cross-section, the base 10 being for the most part flat and the side flanges 12 being joggled at 14, the displacement being equal to the thickness of the material. Towards the margins the base 10 is formed with two corrugations on either side forming two ribs 16 projecting upwardly and two ribs 18 projecting downwardly. The space between the base portions 10 of the two components forms a channel for the cartridge belt 20, this belt being of the "disintegrating" type. The ribs 16 and 18 support the cartridges themselves, as shown clearly in Figure 2, and maintain the links of the belt 20 out of contact with the chute, thereby minimising friction. The width of this channel is of course slightly greater than the length of the cartridges.

Figure 3 shows a modified construction in which the flange 12 on one side projects upwardly and that on the other side projects downwardly. As will be seen, such components nest together in the same way as those shown in Figures 1 and 2.

If desired, in order to save space, a chute built up of components such as are illustrated in Figures 1 and 2 may be made with the uppermost component differing from the rest as shown in Figure 4, that is to say, that the flanges 12 bend inwards as at 22, these flanges forming the upper walls of the uppermost channel and being formed with ribs 23. Naturally, such a construction cannot be employed with the form of component illustrated in Figure 3.

Figure 1:
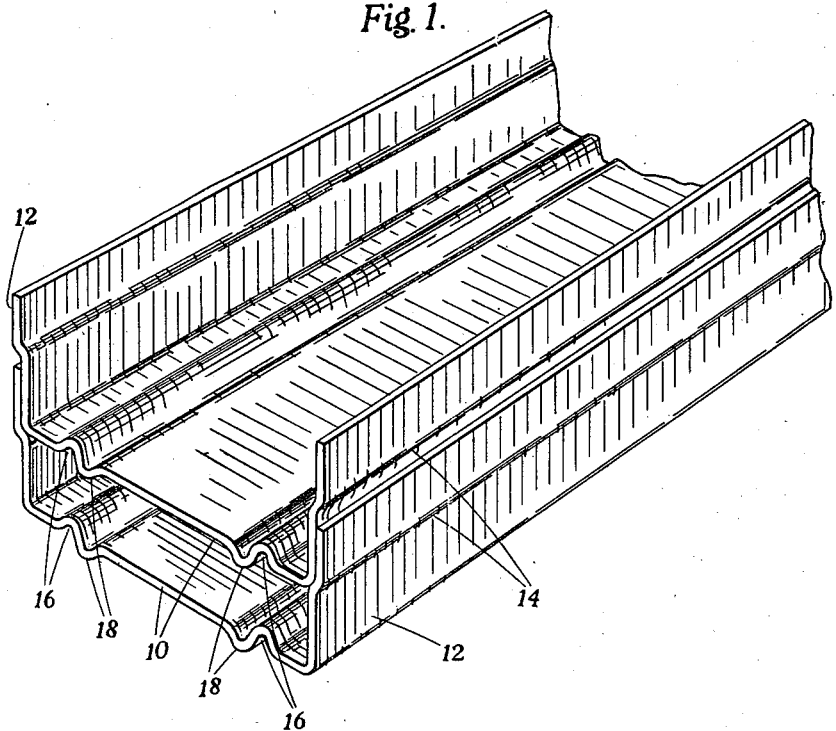
Figure 2:
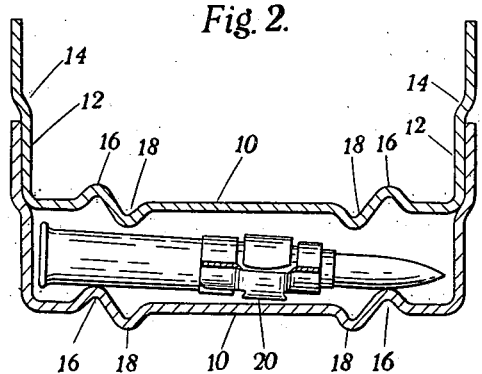
Figure 3:
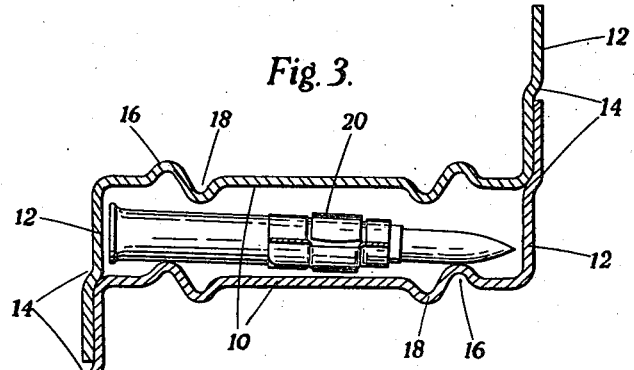
Figure 4:
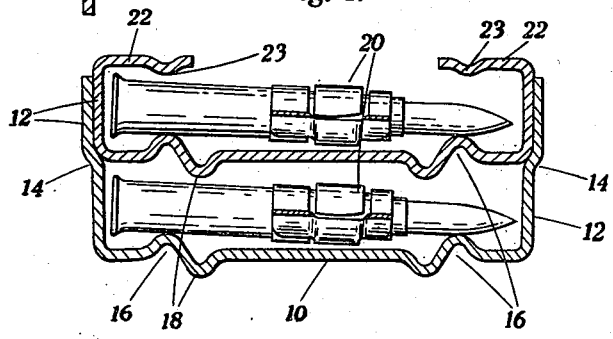
Figure 5:
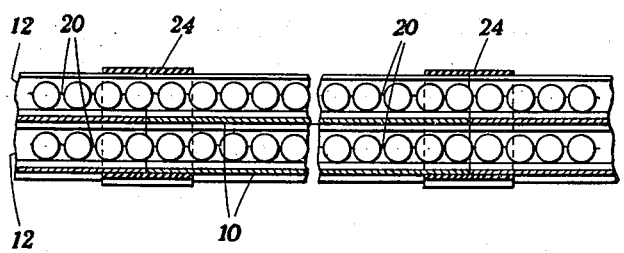
Figure 5 illustrates how components such as are described above may be connected together end to end by encircling straps 24.
Figure 6:
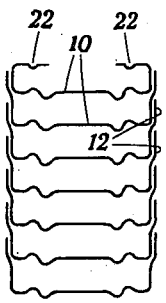
Figure 6 illustrates a complete chute comprising seven channels the uppermost of which is formed like that of Figure 4.

It will be appreciated that cartridge chutes of the kind described are particularly useful in aircraft in which the cartridge belt may have to be fed while the aeroplane is at any angle or, indeed, upside down. The construction is very light in weight and therefore very suitable for aircraft.

The components are secured together either by an adhesive or by the use of heat and pressure according to the characteristics of the material composing them.

The preferred material for the improved chutes is cellulose acetate. Sheets of this material are heated to render them plastic and pressed between dies of the required shape. The components are then secured together by applying a solvent for cellulose acetate, for example acetone.

The components may be made straight or curved, and with or without twist, according to requirements.

I claim:

1. A multiple chute or guide for machine-gun cartridge belts built up from components consisting of flanged strips of "plastic" material, preferably cellulose acetate, so constructed that they can be nested together to provide two or more channels each capable of receiving and guiding a single belt of cartridges.

2. A multiple chute or guide according to claim 1 wherein each component consists of a central portion which is more or less flat and two side flanges projecting on the same side so that the component is U-shaped in cross-section.

3. A multiple chute or guide according to claim 1 wherein each component consists of a central portion which is more or less flat and two side flanges projecting on opposite sides of the central portion.

4. A multiple chute according to claim 1 wherein the flanges are deeper than the channels to be provided between the components and are joggled or cranked to provide shoulders about midway of their width to facilitate nesting together of the components.

5. A multiple chute according to claim 1 wherein the central portions of the components are corrugated to provide ribs extending lengthwise of the components, certain of these ribs projecting above and others projecting below the said portions.

6. A multiple chute according to claim 1, the central portions of the components being corrugated to provide two ribs near each margin of the central portion, one of the two projecting upwardly and the other downwardly.

7. A multiple chute according to claim 1 wherein one of the components has its flanges bent inwards parallel with the central portion, for the purpose described.

8. A multiple chute according to claim 1 wherein the thickness of the components is uniform throughout their cross-section.

9. A component for a multiple chute according to claim 1 made by pressing between dies of the appropriate shape a sheet of cellulose acetate rendered plastic by heating.

FRANCIS CARL JOHNSON.